(12) United States Patent
Blomkvist

(10) Patent No.: US 9,011,701 B2
(45) Date of Patent: Apr. 21, 2015

(54) METHOD AND DEVICE FOR TREATMENT OF LIQUID MATERIALS BASED ON ORGANIC WASTE PRODUCTS

(75) Inventor: Ove Blomkvist, Oslo (NO)

(73) Assignee: Conterra Technology AS, Kjeller (NO)

( * ) Notice: Subject to any disclaimer, the term of this patent is extended or adjusted under 35 U.S.C. 154(b) by 1001 days.

(21) Appl. No.: 12/438,227

(22) PCT Filed: Aug. 21, 2007

(86) PCT No.: PCT/NO2007/000293
§ 371 (c)(1),
(2), (4) Date: Apr. 12, 2010

(87) PCT Pub. No.: WO2008/030099
PCT Pub. Date: Mar. 13, 2008

(65) Prior Publication Data
US 2010/0186469 A1      Jul. 29, 2010

(30) Foreign Application Priority Data

Aug. 22, 2006 (NO) .................................. 20063755

(51) Int. Cl.
*B01F 7/16* (2006.01)
*B01F 7/18* (2006.01)
*B01F 15/06* (2006.01)
*C02F 11/14* (2006.01)
*C05F 7/00* (2006.01)
*F26B 17/18* (2006.01)
*B01F 7/00* (2006.01)
*B01F 13/10* (2006.01)
*F26B 5/00* (2006.01)

(52) U.S. Cl.
CPC ............. *B01F 7/00641* (2013.01); *B01F 7/166* (2013.01); *B01F 7/18* (2013.01); *B01F 13/1041* (2013.01); *B01F 15/065* (2013.01); *C02F 11/14* (2013.01); *C05F 7/00* (2013.01); *F26B 5/005* (2013.01); *F26B 17/18* (2013.01); *B01F 2013/1083* (2013.01); *B01F 2015/062* (2013.01)

(58) Field of Classification Search
CPC ............. B01F 7/00625; B01F 7/00633; B01F 7/00641; B01F 7/166; B01F 7/18; B01F 13/1041; B01F 15/065; B01F 2013/1083; B01F 2015/062; C02F 11/14; C05F 7/00; F26B 5/005; F26B 17/18
USPC ......... 210/750, 752, 173, 199, 200, 201, 202, 210/205, 218, 219; 71/11, 12, 64.03, 64.04; 366/291, 292, 293, 296; 422/187, 630, 422/644, 646, 647, 225
See application file for complete search history.

(56) References Cited

U.S. PATENT DOCUMENTS

| 4,038,180 | A | * | 7/1977 | Talbert | 71/12 |
| 4,403,868 | A |   | 9/1983 | Kupka |  |
| 4,743,287 | A |   | 5/1988 | Robinson |  |
| 6,299,782 | B1 | * | 10/2001 | Blomkvist | 210/750 |
| 6,966,941 | B1 |   | 11/2005 | Grobler et al. |  |

FOREIGN PATENT DOCUMENTS

| CN | 2200501 Y | 6/1995 |
| CN | 1210508 A | 3/1999 |
| FR | 2799397 A1 | 4/2001 |
| RU | 2109696 C1 | 4/1998 |
| RU | 2142930 C1 | 12/1999 |
| WO | 9730008 A1 | 2/1997 |
| WO | 9730008 | 8/1997 |

OTHER PUBLICATIONS

Office Action for Chinese Application No. 200780035503.0, Dec. 13, 2010 (9 p.).
PCT/NO2007/000293 International Search Report, Nov. 29, 2007.
Chinese Office Action dated May 30, 2012; Chinese Application No. 200780035503.0 (7 p.).

\* cited by examiner

Primary Examiner — Lucas Stelling
(74) Attorney, Agent, or Firm — Conley Rose, P.C.

(57) ABSTRACT

The present invention relates to a method and arrangement for the treatment of liquid material based on organic waste products, in particular sludge from sewage disposal plants and the like, wherein the sludge material is added and mixed with chemicals, in particular sulphuric acid, nitric acid, and/or ammonia, during the vaporization and degasification of liquid from the material to increase the solids content thereof. The present invention is characterized, inter alia, in that the material is continuously introduced at the upper part of a vertical mixing vessel (1), in which the material is subject to mixing, after which the material is passed on into a reactor tank (8) for sulphuric acid treatment and at the same time, while sinking through the sulphuric acid treatment reactor tank (8), is exposed to an impact action from a number of rotary processing means (9) disposed in the reactor tank (8), after which the material is passed on into a reactor tank (14) for ammonia treatment and at the same time, while sinking through the ammonia treatment reactor tank (14), is exposed to an impact action from a number of rotary processing means (9) disposed in the reactor tank (14), after which the material is finally passed on into a drier (15) in which the material is dried until a desired solids content is achieved.

20 Claims, 2 Drawing Sheets

METHOD AND DEVICE FOR TREATMENT OF LIQUID MATERIALS BASED ON ORGANIC WASTE PRODUCTS

CROSS-REFERENCE TO RELATED APPLICATIONS

The present application claims the benefit of priority to PCT/NO2007/000293 filed 21 Aug. 2007, which is hereby incorporated herein by reference in its entirety for all purposes, and claims the benefit of priority to Norwegian Patent Application No. 2006 3755 filed 22 Aug. 2006, which is also incorporated herein by reference in its entirety for all purposes.

STATEMENT REGARDING FEDERALLY SPONSORED RESEARCH OR DEVELOPMENT

Not applicable.

The invention relates to a method and arrangement for the treatment of liquid materials based on organic waste products, especially sludge from sewage disposal plants.

In particular, the treatment is carried out in order to provide high value organic fertilizer products in which added nutrients are bound organically. The fertilizer product is intended to provide for desirable crop yields and to replace the use of mineral fertilizer. The current conventional mineral fertilizers include easily soluble nutrients, and were originally developed for being a supplement to manure. In earlier times, most farms were supplied with manure from their own farm animals. With the easily soluble nutrients that were brought in with the mineral fertilizers, significantly improved crop yields were achieved the short term. A gradually increasing use of mineral fertilizers has exhausted the soil to an extent that has resulted in large uncultivable land areas. Moreover, the use of mineral fertilizers and eradicants has resulted in a significant run-off to rivers, lakes and oceans, which has destroyed or is threatening other life systems. In order to stop this unfortunate trend, several countries have introduced an environmental tax on mineral fertilizers in order to limit the use thereof. It is hence an object of the present invention to provide a method and arrangement that are able to improve the provision of organic fertilizer products which, in a long term perspective, may fully or partially replace the use of mineral fertilizer.

Known processing plants for the conversion of sewage, for example, to organic fertilizer products are based on the batch-wise feeding of the material into a processing chamber in which chemicals are added. The addition of the chemicals into the mass causes reactions to occur that effect the generation of heat and liquid vaporization, pH regulation and nitrogen elevation in the end product. The thus chemically treated mass is then supplied with heat for effecting liquid vaporization in order to achieve the desired solids percent in the final product.

These prior art methods suffer from several disadvantages and drawbacks. The batchwise treatment is hence not a very efficient solution. Moreover, the relatively high temperatures being used (generally well above 200° C.) will render ineffective humic acids and other substances that are important for improving the soil.

Furthermore, when the reaction processes occur within the mass, the liquid degasification will be impeded and generally diminish the results of the reaction treatments. Also, when applying extreme heat in the degasification/drying process and in the granulation process subsequent to the reaction treatment, the temperature must be kept sufficiently low so that the valuable soil-improving substances of the material are not lost. Various low temperature technology processes exist that may be adapted for this purpose, but the properties of the material from the reaction treatment is also of vital importance for the result of the process.

The U.S. Pat. No. 302,813, having the same inventor as the present application, relates to a method and arrangement that enable a continuous sludge dehydration process and that don't require external heating of the sludge to effect the necessary vaporization, while at the same time the temperature is to be kept sufficiently low so that none of the valuable soil-improving substances of the material are lost. The reaction processes are initiated when the materials are direct shock treated by rotary processing means while falling down through the vertical treatment chamber. Liquid and air are beaten out from the pores in the solid particles of the mass, forming compact, free particles having unrestricted degasification conditions. At the same time, the released liquid gets a relatively large surface and thereby excellent vaporization/degasification conditions with a cooling effect, acting to keep the temperature sufficiently low. At the same time, the heat developed in the chemical reactions and friction treatment is sufficient to provide for the desired vaporization. In such a continuous process, free liquid surrounding the particles will ensure an adequate absorption of the supplied heat energy.

The present invention is directed to an improvement of the technology described in U.S. Pat. No. 302,813. It is, in particular, an object of the present invention to increase the degree of reaction in the shock treatment by the rotary processing means during the movement of the material through the vertical treatment chambers, to thereby increase the degree of dehydration and nitrogen portion/nutrient content of the resulting fertilizer product while at the same time the use of chemicals such as sulphuric acid and ammonia may be reduced in that the capture of added nutrients in the fertilizer product is significantly increased. It is a further object of the present invention to provide an improved method and arrangement for carrying out the last dehydration step.

These objects are achieved according to the invention by a method and arrangement as set forth in the following claims.

In the following, the invention will be described in more detail with reference to the attached drawings, in which.

Figure 1:
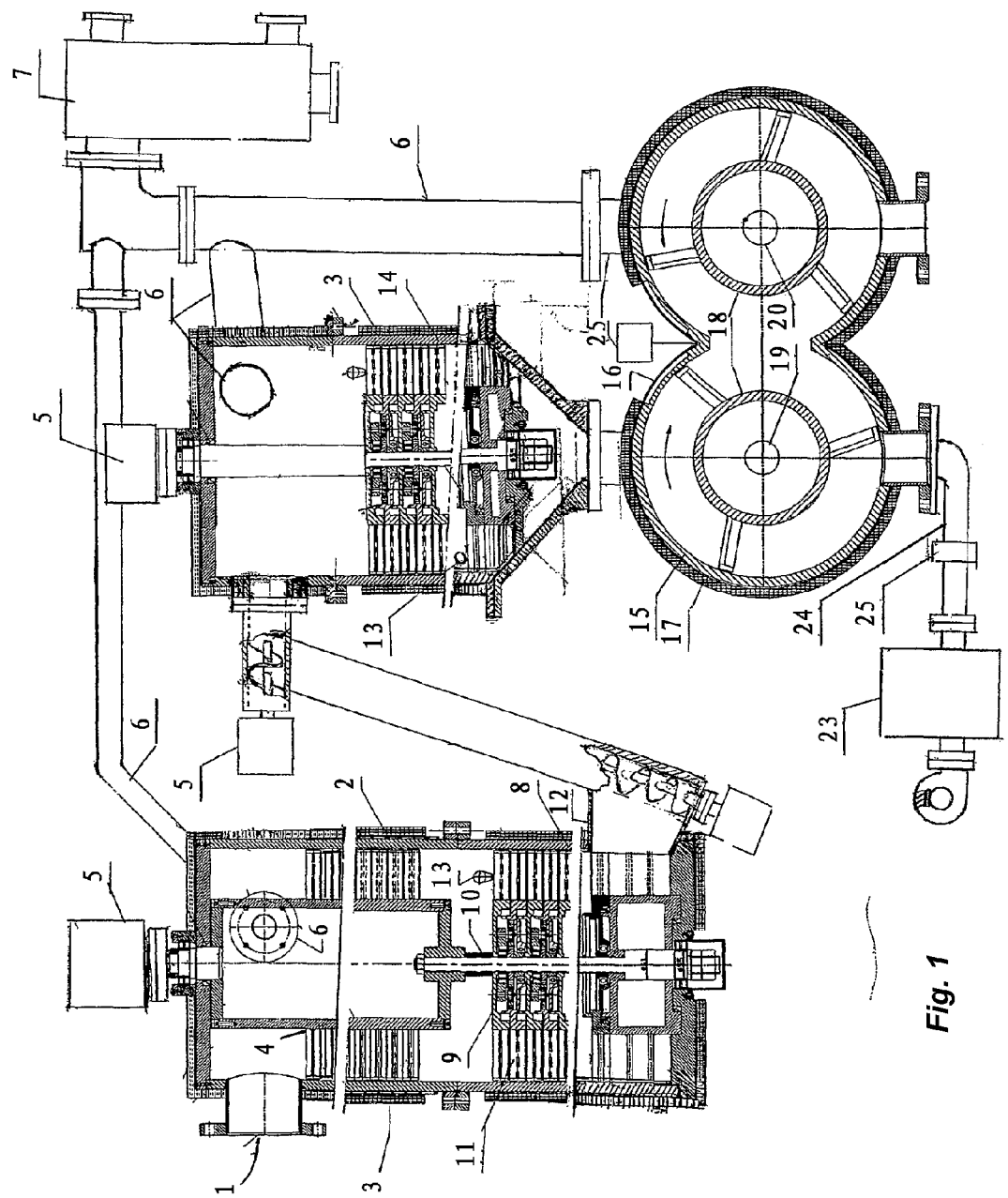
FIG. 1 shows a view of a possible embodiment of the present invention.

The process according to the invention, as shown schematically in FIG. 1, comprises a number of process steps, of which the first step includes feeding bio mass, in the form of sludge from sewage disposal plants and possibly other organic waste products, for example, into a mixing vessel 1. The mixing vessel 1 may be comprised of, for example, a cylindrical, thick-walled steel tank provided with an external electric heating loop, induction coil, water/gas borne heating loop 2, or the like. Preferably, mixing vessel 1 includes an outer heat-insulating jacket 3. Inside mixing vessel 1, a number of rotors 4 are arranged, each comprising several impact arms, at several vertical levels. Rotors 4 may be driven by an electric or hydraulic motor 5, for example, possibly in combination with a cone belt or the like. The purposes of mixing vessel 1 are to mix the biomass into a homogenous mixture, divide larger particles into small, dispersed particles, and to heat the biomass using a combination of friction treatment and supplied heat, to approx. 55° C., for example. From mixing vessel 1, exhaust gas is lead via an exhaust gas outlet stub 6 to a condenser 7, from which the condensate will be excellently suited for use as fluid fertilizer.

From mixing vessel 1, the preprocessed biomass will, by way of gravity, fall directly down into a reactor tank 8 for sulphuric acid treatment. Said sulphuric acid treatment forms process step 2. Reactor tank 8, like mixing vessel 1, includes a cylindrical, thick-walled steel tank, and is, in the present exemplary embodiment, flange-connected to mixing vessel 1. Like mixing vessel 1, reactor tank 8 includes an outer heat-insulating jacket 3, but as opposed to mixing vessel 1, reactor tank 8 does not include a heating loop 2. Reactor tank 8 also includes rotors 9, with the rotors 9 of reactor tank 8 sharing or being connected to rotor shaft 10 of the rotors 4 of mixing vessel 1. Rotors 9 are arranged to impact in alternately opposite directions. This may be achieved in that rotor shaft 10 is provided with a number of arm-rings 11, with each arm-ring being provided with a number of impact arms, such as 4 on each arm-ring, for example. The first arm-ring may be mounted to rotor shaft 10 in a spline connection, with the other arm-ring being rotated in the opposite rotational direction by means of a spline connection and planetary transmission consisting of a sun gear, planet wheel, planet wheel receptacle and inner toothed ring gear, as well as a sprag-type unidirectional clutch between the rotor shaft 10 and planet wheel receptacle. All succeeding arm-rings may have the same rotational direction as the first arm-ring, or else (preferably) every second arm-ring may blow in the opposite direction, depending on the number of planetary transmissions being used and indeed also depending on the number of arm-rings 11 included in the reactor tank 8. The lowermost arm-ring is specially designed to hurl, by way of the centrifugal force, the biomass out through an outlet stub 12 of reactor tank 8 to the next process step 3.

It is understood that reactor tank 8 may also be fully or partially separate from mixing vessel 1, in which case mixing vessel 1 could include an outlet stub through which the biomass would be discharged and passed on through a suitable piping to reactor tank 8. It is also understood that it is not required that mixing vessel 1 and reactor tank 8 share the same rotor shaft 10, even though, at least in this example, this is considered practical.

Above arm-rings 11 in reactor tank 8, in the present exemplary embodiment, a sulphuric acid inlet pipe 13 acid is provided. The purpose of reactor tank 8 is to effect a reaction treatment of the biomass using sulphuric acid in order to 1) release water that is bound in microscopic cell bindings of the biomass, 2) add further organically bound nutrient to the biomass, 3) friction process the biomass in order to speed up the reactions and increase the temperature, 4) lower the pH to a level between 0.5 and 2, for example, 5) increase the temperature of the biomass due to the exothermal reaction to approx. 85° C. (preferably above approx. 70°), for example, with the pH reduction and heating providing a two-fold sanitation of the biomass, and 6) degasify water up through mixing vessel 1 and exhaust outlet stub 6 to the condenser 7.

It has turned out that in particular the counter-rotating movement of arm-rings 11, together with the temperature increase due to the addition of sulphuric acid and the friction treatment, results in a beneficial short treatment time in the reactor tank. The counter-rotation of arm-rings 11, and hence of the biomass, optimizes the mixing of sulphuric acid and the break-up of the cell bindings of the biomass, while at the same time the distribution of sulphuric acid in the biomass becomes more homogenous than if the arm-rings 11 were hitting in the same direction.

When the lowermost arm-ring, by way of the centrifugal force, has discharged the biomass through an outlet stub 12 of reactor tank 8, the biomass is carried to a reactor tank 14 for ammonia treatment. This is process step 3. The biomass is transferred from reactor tank 8 to reactor tank 14 by rotary feeding or the like, for example. According to the present embodiment, reactor tank 14 also includes a cylindrical, thick-walled steel tank having an outer heat-insulating jacket 15. In principle, reactor tank 14 does not need a heating loop. Like sulphuric acid treatment reactor tank 8, reactor tank 14 includes counter-rotating rotors, an outlet stub for carrying exhaust gases to condenser 7, etc. Ammonia, in the form of ammonia spirit, is fed into reactor tank 14 through a suitable nozzle located above the uppermost impact arm, or else ammonia gas is fed into reactor tank 14 through a suitable nozzle at the lower impact arm. The ammonia treatment yields a further degasification, with the exhaust gas being discharged through an outlet stub at the upper edge of the uppermost impact arm to condenser 7, in which the condensate forms fluid fertilizer.

The purpose of reactor tank 14 is to effect a reaction treatment of the biomass using ammonia in order to 1) release water that is bound in microscopic cell bindings of the biomass, 2) add further organically bound nutrient to the biomass, 3) friction process the biomass, 4) increase the pH to a value of about 6 (a pH of between 5 to 8, preferably approx. 6), and 5) increase the temperature of the biomass due to the exothermal reaction to above 100° C. (above 85° C., preferably above 100° C.), with the increased pH and heating providing a two-fold sanitation of the biomass. The biomass has now become a high-grade organically bound fertilizer product.

Following process step 3, the biomass has a solids content of about 55-60%. In order to effect a further drying of the biomass, the biomass is passed on to a drier 15. The drier constitutes process step 4. In the present embodiment, the drier 15 includes two welded, thick-walled steel cylinders mounted in parallel having a center distance equaling the cylinder diameter minus approx. 20 millimeter. The drier 15 includes an external electric heat loop, an induction coil or water/gas borne heating loop 16, as well as an outer heat-insulating jacket 17. Each of the two weld-together, parallel, thick-walled steel cylinders forming drier 15 includes several levels of counter-rotating rotors 18, each having a number of, such as three or four, for example, impact arms. The assembly of counter-rotating rotors is driven by two counter-rotating rotor shafts 19, 20 powered through a transmission 21 or the like by a suitable motor 22, such as a flanged electric motor, hydraulic motor, or the like.

Figure 2:
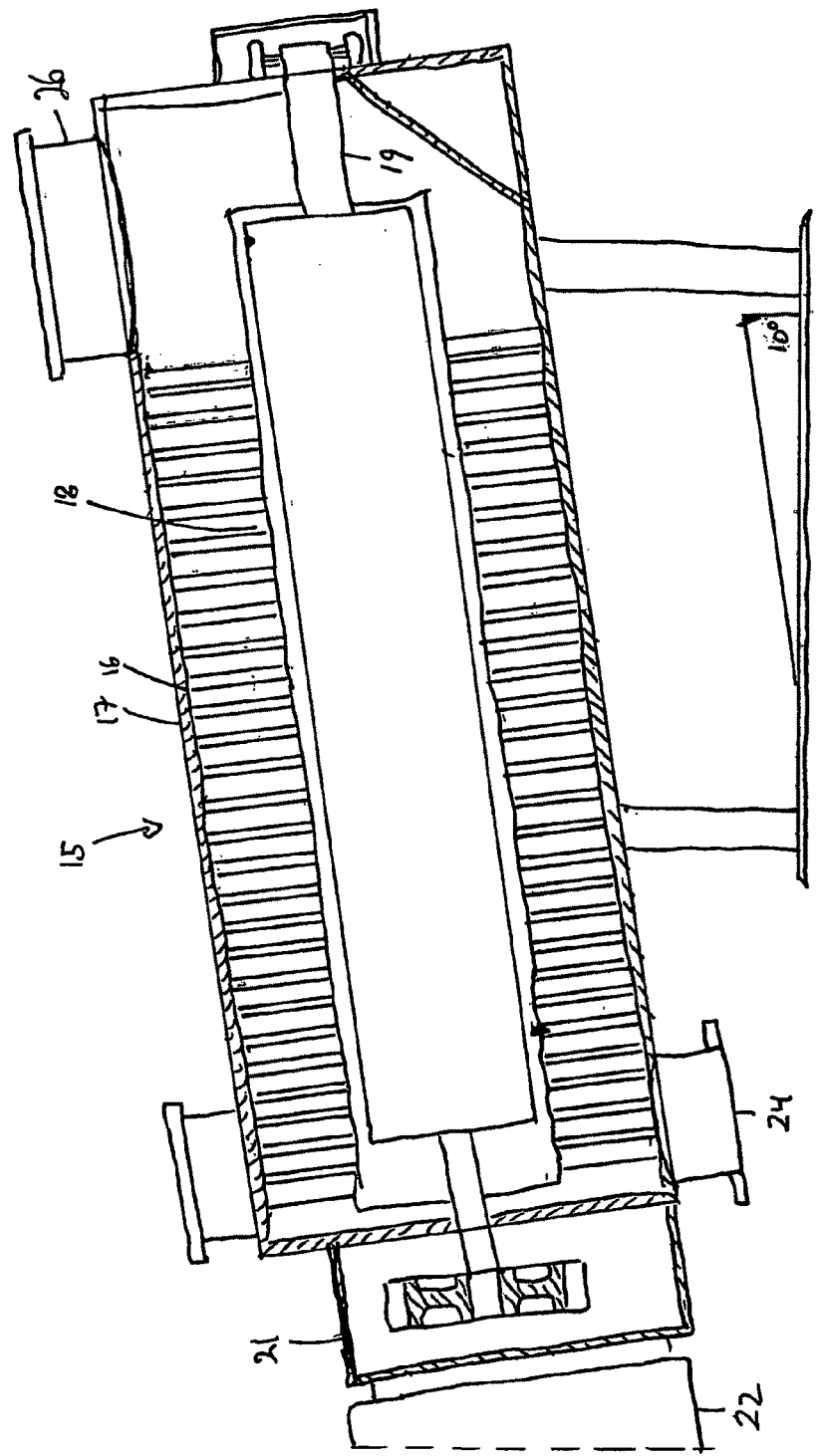
FIG. 2 shows a side view of a possible embodiment of the drier according to the present invention.

Hot air fed in counterflow through drier 15 to the biomass. A hot air tap 23 heats air which is then fed through a hot air inlet stub 24. Inlet stub 24 is provided with a vibrating motor 25 imparting high frequency oscillations to the hot air, generally in the order of 20 kHz. The biomass is also put in vibration by means of a vibrating motor 25 mounted in connection with drier 15 at the center line of biomass inlet stub 26. Advantageously, drier 15 may be tilted (e.g. by 10°) so that gravity will urge the biomass through drier 15. FIG. 2 shows an exemplary embodiment of drier 15 according to the present invention.

The purpose of drier 15 is to expel the remaining moisture from the biomass and to bring the biomass to a solids level of e.g. approx. 85% (between 70-99%, preferably approx. 85-90%). This is achieved by way of the friction treatment, heating, and vibration. The combined effect of these actions increases the temperature and ensures that the water content of the biomass vaporizes, speeding up the drying process significantly. The counter-rotating rotors 18 make sure the biomass is made and remains homogenous and composed by fine particles, with the fine particles providing for a maximum surface area speeding up the vaporization of the water. The applied vibration ensures that water drops are vaporized to form aerosols, with the air flow-through expelling the aerosols, and hence the moisture, from drier 15. In the absence of such applied vibrations, the drying process step 4 would be prohibitively time consuming. In practice, it would not be possible to achieve a sufficiently high level of solids in the end product.

It is an important feature of the invention that the drying process is carried out with a combination of hot air supply and vibration.

As mentioned above, the purpose of condenser 7 is to transition the exhaust gases from said process steps to a liquid form, whereby the condensate will form an excellent liquid fertilizer product.

The present process steps 1-4 with the subsequent reaction chambers and friction treatment of the biomass have resulted in a significantly reduced reaction time as well as significantly improved and more reliable reaction products as compared to the conventional batch treatment. With the additional provision of counter-rotation of the impact arms used in each process step, this has lead to a significantly improved turbulent and homogenous biomass environment for the following process steps. The turbulent and homogenous biomass environment ensures that the sulphuric acid added into reaction tank 8 is more rapidly taken up and allowed to fully react with the biomass. Similarly, the turbulent and homogenous biomass environment in reaction tank 15 ensures that the added ammonia is more rapidly taken up and allowed to fully react with the biomass. The result is that a substantially higher content of important nutrients in the end product is achieved in a less amount of time and with the same or a reduced amount of added sulphuric acid and ammonia.

Also, tests has shown that the use of higher temperatures in the biomass during the reaction treatment reduces the consumption of sulphuric acid and ammonia, resulting in a reduced pH regulation as compared to biomass having lower temperatures, that requires an extensive pH regulation in order to achieve the same result in terms of liquid release, nutrients supply, desired sanitation to a so-called edible product, as well as desired end product quality including organically bound nutrients.

It is understood that the present invention may be configured in various manners, and that the disclosed embodiment is only intended to serve as an example. Several modifications will be possible. For example, the arrangement may be constructed as a continuous high column, the reaction chamber design may be varied, and the number of rotors may vary. Additionally, the temperatures, frequencies, pH levels, solids contents, etc. indicated above may be adjusted as necessary. Also, it would be possible to replace sulphuric acid with nitric acid, even though this has not yet given equally excellent results.

The invention claimed is:

1. A method for the treatment of liquid comprising organic waste-based material, the method comprising:

continuously introducing the material at the upper part of a vertical mixing vessel, subjecting the introduced material to mixing, passing the mixed material on into a first reactor tank for acid treatment, wherein the first reactor tank has disposed therein a first rotary processing means having a first plurality of counter rotating arm-rings, subjecting the mixed material to an impact action via the first rotary processing means as the mixed material therein sinks through the first reactor tank, passing the material from the first reactor tank into a second reactor tank for ammonia treatment, the second reactor tank having disposed therein a second rotary processing means having a second plurality of counter rotating arm-rings, subjecting the material in the second reactor tank to an impact action via the second rotary processing means as the material therein sinks through the second reactor tank, and subsequently drying the material in a drier until a desired solids content is achieved, wherein every arm-ring of the first and second plurality of counter rotating arm-rings simultaneously moves in a direction opposite the direction of an adjacent arm-ring.

2. The method of claim 1, further comprising conducting exhaust steam, exhaust gas or both formed due to chemical reactions, mechanical treatment, or both, away from the mixing vessel, the first reactor tank, the second reactor tank, the drier, or a combination thereof to a collection point.

3. The method at claim 2, wherein the collection point comprises a condenser capable of transitioning the exhaust steam, the exhaust gas, or both to a liquid form.

4. The method of claim 1, wherein the drier comprises two cylinders arranged in parallel having several levels of counter-rotating rotors, and wherein drying comprises feeding hot air through the drier in counterflow to a material movement direction and putting the material in vibration by means of a vibrating motor.

5. The method of claim 1, further comprising feeding hot air through the mixing vessel, the first reactor tank, the second reactor tank, or a combination thereof in counterflow to the material movement direction therein.

6. The method of claim 1, further comprising putting the material in the mixing vessel, the first reactor tank, the second reactor tank, or a combination thereof in vibration.

7. The method of claim 1, wherein the desired solids content is in the range of 70-99%.

8. The method of claim 1, wherein acid treatment of the material in the first reactor tank further comprises reducing the pH of the material therein to a level between about 0.5 and 2, and increasing the temperature of the material therein to a temperature above about 70° C.

9. The method of claim 1, wherein ammonia treatment of the material in the second reactor tank further comprises increasing the pH of the material therein to a level of about 6 and increasing the temperature of the material therein to a temperature above about 90° C.

10. The method of claim 1 wherein the liquid comprising organic waste-based material comprises sludge from a sewage disposal plant.

11. The method of claim 1 wherein acid treatment comprises sulphuric acid treatment, nitric acid treatment, or both.

12. The method of claim 7 wherein the desired solids content is in the range of 85-90%.

13. A system for the treatment of liquid comprising organic waste-based material by contact with chemicals selected from sulphuric acid, nitric acid, ammonia, and combinations thereof and vaporization and degasification of liquid from the material to increase the solids content thereof, the system comprising:

a vertical mixing vessel configured to mix the material, a first reactor tank configured for acid treatment, wherein the first reactor tank has disposed therein a first rotary processing means, a second reactor tank configured for ammonia treatment, wherein the second reactor tank has disposed therein a second rotary processing means, and a drier configured for drying a material introduced therein to a desired solids content, wherein the first rotary processing means comprises a first plurality of axially-aligned arm-rings, each arm-ring of the first plurality being configured to move simultaneously in a counter-rotational direction relative to an adjacent arm-ring, wherein the second rotary processing means comprises a second plurality of axially-aligned arm-rings, each arm-ring of the second plurality being configured to move simultaneously in a counter-rotating direction relative to an adjacent arm-ring.

14. The system of claim 13, further comprising at least one duct configured to carry exhaust steam, exhaust gas, or both formed due to chemical reactions or mechanical treatment away from the mixing vessel, the first reactor tank, the second reactor tank, the drier, or a combination thereof, to a collection point.

15. The system of claim 14, further comprising a condenser fluidly connected with the at least one duct and configured to transform the exhaust steam, the exhaust gas, or both to a liquid form.

16. The system of claim 13, wherein the drier comprises two cylinders arranged in parallel having several levels of counter-rotating rotors and a vibrating motor configured to impart vibrations to a material therein, and wherein the drier is provided with means for flowing hot air in counterflow to a material movement direction within the drier during operation.

17. The system of claim 13, further comprising means for flowing hot air in counterflow direction to a material movement direction in the mixing vessel, the first reactor tank, the second reactor tank, or a combination thereof, during operation.

18. The system of claim 13, further comprising at least one vibrating means coupled with the mixing vessel, the first reactor tank, the second reactor tank, or a combination thereof.

19. The system of claim 13, wherein the drier is configured to dry a material therein to a solids content in the range of 70-99%.

20. The system of claim 19 wherein the drier is configured to dry a material therein to a solids content in the range of 85-90%.

* * * * *